US010328556B2

(12) United States Patent
Dengel

(10) Patent No.: US 10,328,556 B2
(45) Date of Patent: Jun. 25, 2019

(54) NAIL PLATE TOOL

(71) Applicant: Harlan F. Dengel, Hebron, ND (US)

(72) Inventor: Harlan F. Dengel, Hebron, ND (US)

( * ) Notice: Subject to any disclaimer, the term of this patent is extended or adjusted under 35 U.S.C. 154(b) by 226 days.

(21) Appl. No.: 15/370,248

(22) Filed: Dec. 6, 2016

(65) Prior Publication Data

US 2017/0080552 A1 Mar. 23, 2017

Related U.S. Application Data

(63) Continuation of application No. 14/572,383, filed on Dec. 16, 2014, now Pat. No. 9,517,553.

(51) Int. Cl.
*B25C 3/00* (2006.01)
*F16B 15/00* (2006.01)

(52) U.S. Cl.
CPC .......... *B25C 3/006* (2013.01); *F16B 15/0046* (2013.01)

(58) Field of Classification Search
CPC ....... B25B 11/002; B25B 11/02; B25B 31/00; B25B 33/00; B25C 3/00–008; B27F 7/15; B27F 7/155; F16B 15/0023
See application file for complete search history.

(56) References Cited

U.S. PATENT DOCUMENTS

| | | | | | |
|---|---|---|---|---|---|
| 191,643 | A | * | 6/1877 | Bowen | B27F 5/12 30/167.1 |
| 1,308,654 | A | * | 7/1919 | Bopst | G01B 3/1084 294/15 |
| 2,410,467 | A | * | 11/1946 | Valentine | B27B 25/10 294/15 |
| 2,723,875 | A | * | 11/1955 | Russell | H01F 7/0257 294/65.5 |
| 2,873,136 | A | * | 2/1959 | Bennet | B01L 3/18 294/65.5 |
| 3,837,274 | A | | 9/1974 | Zaccard | |
| 4,001,903 | A | * | 1/1977 | Hay | B25B 9/00 294/15 |
| D255,637 | S | * | 7/1980 | Kelly | D10/46.2 |
| 4,947,616 | A | | 8/1990 | Sorton | |
| 5,016,509 | A | * | 5/1991 | Stottman | B27B 25/10 294/15 |
| 5,160,126 | A | * | 11/1992 | Atkinson | A47B 95/008 269/102 |
| 5,265,887 | A | | 11/1993 | Stelmach | |
| 5,429,402 | A | * | 7/1995 | Kennedy | B03C 1/28 15/160 |
| 5,495,651 | A | | 3/1996 | Tsuha | |
| 5,820,107 | A | | 10/1998 | Hall | |
| 6,029,407 | A | | 2/2000 | Schillero, Jr. | |
| 6,092,271 | A | | 7/2000 | Stojkovic | |
| 6,135,521 | A | * | 10/2000 | Wirth, Jr. | B27B 25/10 294/15 |

(Continued)

*Primary Examiner* — Tyrone V Hall, Jr.
(74) *Attorney, Agent, or Firm* — Neustel Law Offices

(57) ABSTRACT

A nail plate tool which aids in positioning and installing nail plates in hard-to-reach areas. The nail plate tool generally includes an elongated portion having a handle portion at its first end and a holder portion at its second end. The handle portion is adapted to be grasped by a user and the holder portion is adapted to removably retain a nail plate against the nail plate tool, such as through use of a magnet. By removably securing the nail plate to the holder portion, an individual may more easily reach areas to install a nail plate.

9 Claims, 10 Drawing Sheets

(56) References Cited

U.S. PATENT DOCUMENTS

| | | | |
|---|---|---|---|
| 6,213,373 B1* | 4/2001 | Wakai | B25B 31/00 227/119 |
| 6,886,229 B1 | 5/2005 | Wilson | |
| 6,994,322 B1 | 2/2006 | Wittman | |
| 7,100,475 B1 | 9/2006 | Rufolo, Jr. | |
| 7,147,209 B2 | 12/2006 | Jones | |
| 7,367,098 B2 | 5/2008 | Wang | |
| 7,861,428 B1* | 1/2011 | Clark | B27B 25/10 33/42 |
| 8,713,773 B2 | 5/2014 | Foxx | |
| 9,102,050 B2 | 8/2015 | Su | |
| 2004/0070224 A1* | 4/2004 | Nurmi | B25B 9/00 294/65.5 |
| 2006/0101948 A1 | 5/2006 | Meitzler | |

\* cited by examiner

US 10,328,556 B2

NAIL PLATE TOOL

CROSS REFERENCE TO RELATED APPLICATIONS

I hereby claim benefit under Title 35, United States Code, Section 120 of U.S. patent application Ser. No. 14/572,383 filed Dec. 16, 2014. This application is a continuation of the Ser. No. 14/572,383 application. The Ser. No. 14/572,383 application is currently pending. The Ser. No. 14/572,383 application is hereby incorporated by reference into this application.

STATEMENT REGARDING FEDERALLY SPONSORED RESEARCH OR DEVELOPMENT

Not applicable to this application.

BACKGROUND

Field

The present invention relates generally to a nail plate holder and more specifically it relates to a nail plate tool which aids in positioning and installing nail plates in hard-to-reach areas.

Related Art

Any discussion of the related art throughout the specification should in no way be considered as an admission that such related art is widely known or forms part of common general knowledge in the field.

Nail plates are commonly used in construction areas to aid in connecting multiple structures such as joists together. By their very nature, nail plates are typically intended to be used in ceiling structures which may be difficult to reach due to height. Often, a ladder is necessary to aid in securing such nail plates into place. The use of a ladder is cumbersome, time-costly, and can lead to injury in many cases.

Because of the inherent problems with the related art, there is a need for a new and improved nail plate tool which aids in positioning and installing nail plates in hard-to-reach areas.

SUMMARY

The invention generally relates to a nail plate holder which includes an elongated portion having a handle portion at its first end and a holder portion at its second end. The handle portion is adapted to be grasped by a user and the holder portion is adapted to removably retain a nail plate against the nail plate tool, such as through use of a magnet. By removably securing the nail plate to the holder portion, an individual may more easily reach areas to install a nail plate.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION

Figure 1:
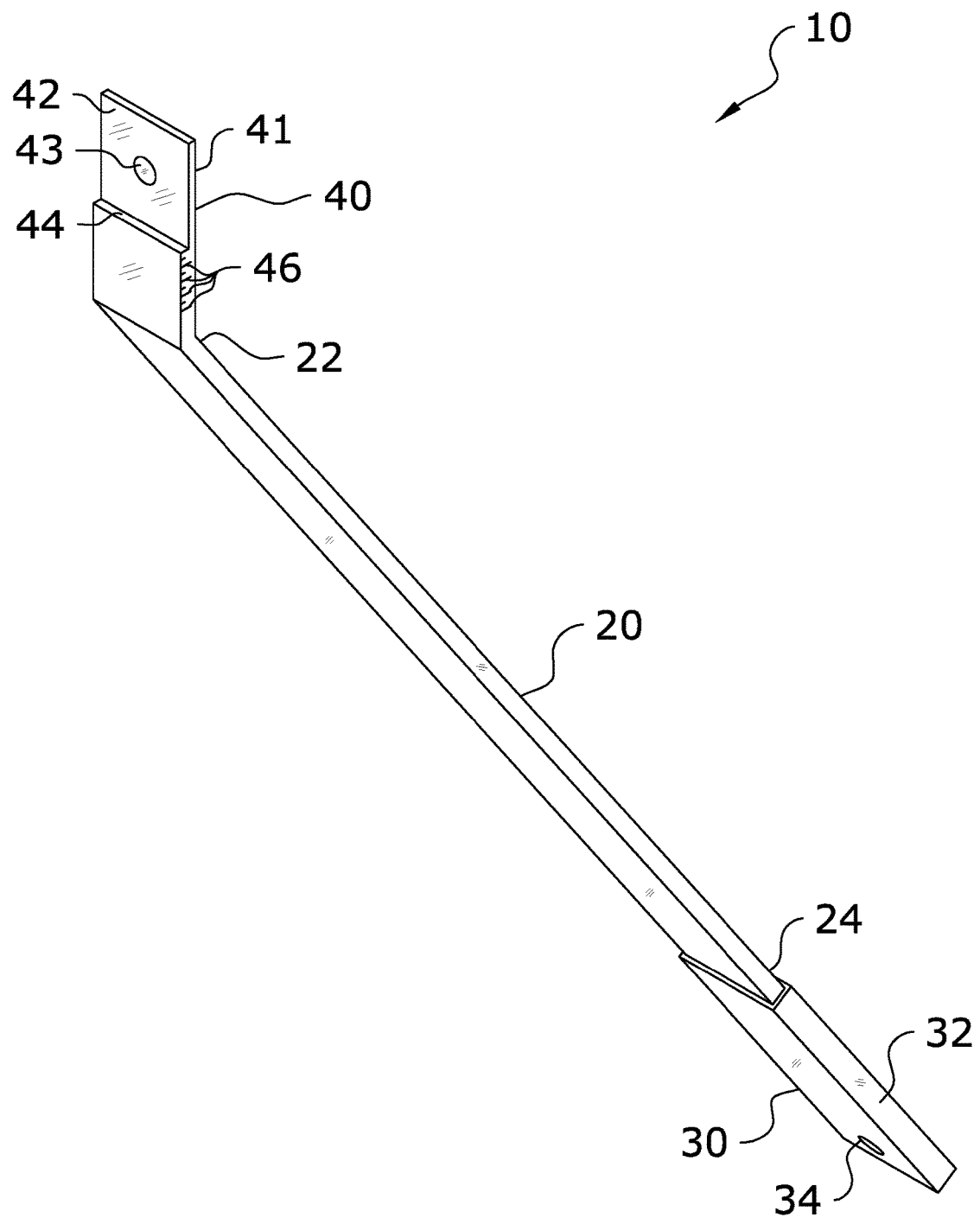
FIG. 1 is a rear upper perspective view of the present invention.
Figure 2:
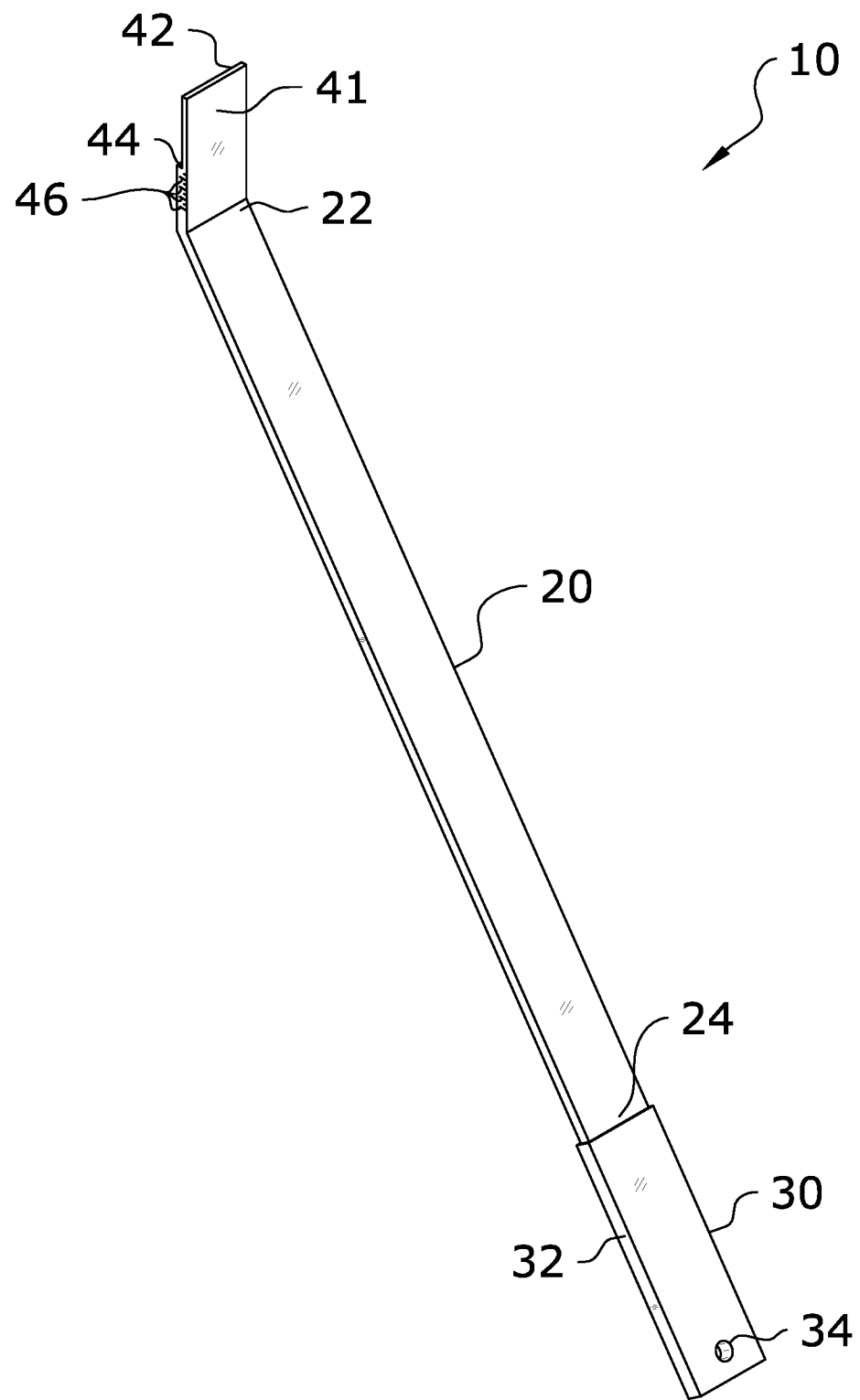
FIG. 2 is a frontal upper perspective view of the present invention.

A. Overview.

Turning now descriptively to the drawings, in which similar reference characters denote similar elements throughout the several views, FIGS. 1 through 10 illustrate a nail plate tool 10, which comprises an elongated portion 20 having a handle portion 30 at its first end 22 and a holder portion 40 at its second end 24. The handle portion 30 is adapted to be grasped by a user and the holder portion 40 is adapted to removably retain a nail plate 12 against the nail plate tool 10, such as through use of a magnet 43. By removably securing the nail plate 12 to the holder portion 40, an individual may more easily reach areas to install a nail plate 12.

B. Nail Plate Tool.

As shown in the figures, the present invention generally comprises an elongated portion 20 having a first end 22 and a second end 24. The elongated portion 20 may be comprised of various lengths for different applications of the present invention. For example, a shorter embodiment may be provided for lower heights whereas a longer embodiment may be provided for greater heights.

The overall shape and configuration of the elongated portion 20, and the present invention as a whole, may vary in different embodiments. Thus, the exemplary configuration and shape shown in the figures should not be construed as limiting on the scope of the present invention. In the embodiment shown in the figures, the elongated portion 20 has a generally rectangular cross-section and a flat configuration.

Figure 3:
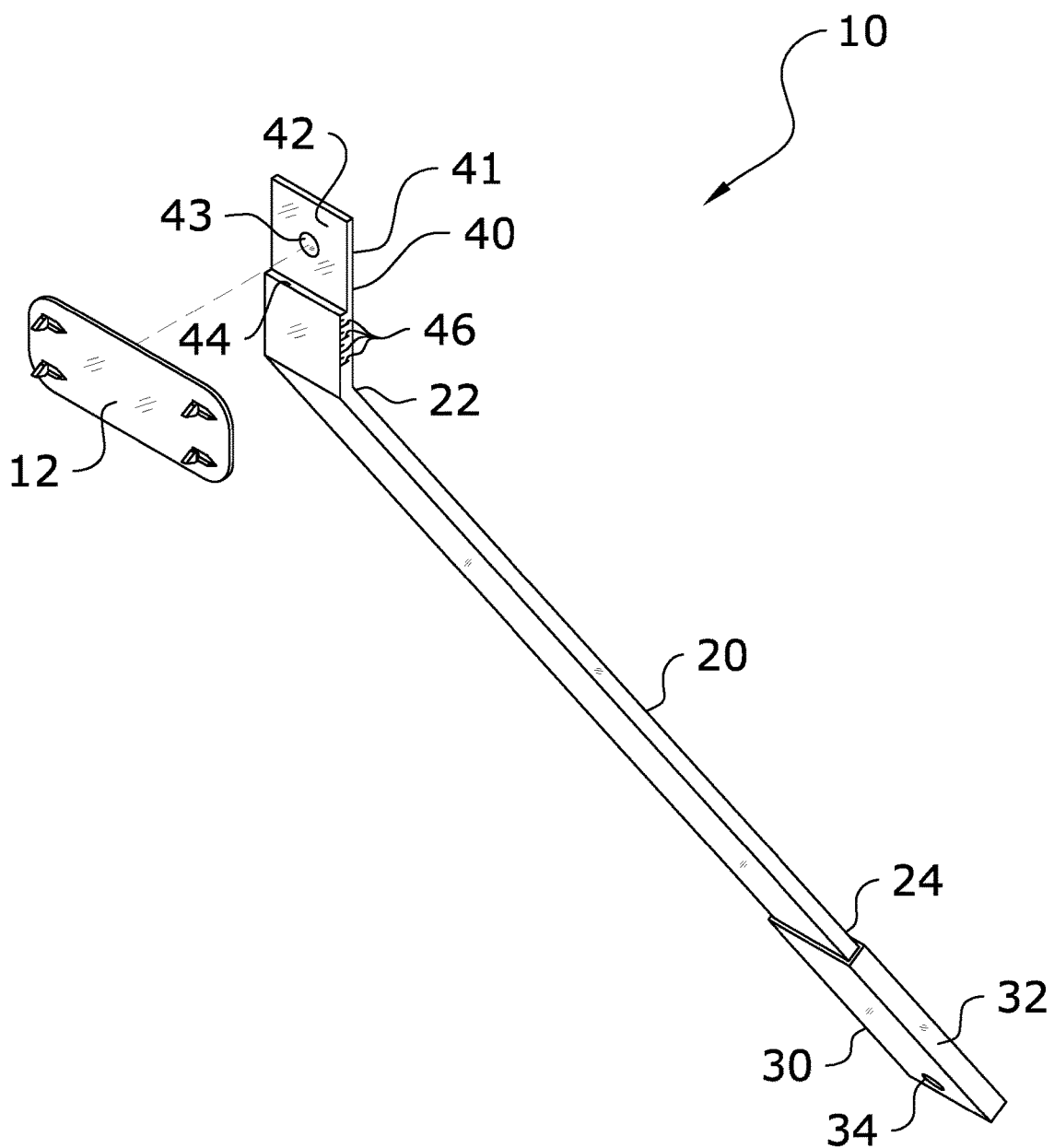
FIG. 3 is a rear upper perspective view illustrating alignment of a nail plate with the holder portion.

The first end 22 of the elongated portion 20 of the nail plate tool 10 includes a handle portion 30 as best shown in FIG. 3. The handle portion 30 comprises the portion of the elongated portion 20 adjacent to its first end 22 that is adapted to be grasped by the user when the present invention is in use.

The handle portion 30 may be comprised of the same shape, configuration, and width as the elongated portion 20 as shown in the figures or it may be comprised of a different shape, configuration and width when compared with the rest of the elongated portion 20. The handle portion 30 will generally include a handle covering 32 comprising a rubber or other malleable covering to increase comfort when grasping the handle portion 30 of the present invention.

The handle portion 30 may also include an aperture 34. The aperture 34 may be located anywhere along the nail plate tool 10. In a preferred embodiment, the aperture 34 is positioned adjacent to the first end 32 of the elongated portion 20 at the handle portion 30. The aperture 34 may be utilized to aid in suspending the nail plate tool 10 from various locations, such as a shelf or the belt of a user of the present invention.

The second end 24 of the elongated portion 20 may include a holder portion 40 which is adapted to removably receive a nail plate 12 such as shown in the figures. The holder portion 40 includes an inner surface 41 which faces the operator of the present invention when in use and an outer surface 42 which faces away from the operation of the present invention when in use. The holder portion 40 includes a magnet 43 which is adapted to retain the nail plate 12 in place against the present invention until it is nailed into position.

The holder portion 40 will generally extend at an angle with respect to the second end 24 of the elongated portion 20 such as best shown in FIG. 3. The angle may vary, but will preferably be greater than ninety degrees to form an obtuse angle. A preferred embodiment will include an angle between the elongated portion 20 and holder portion 40 of at least 120 degrees.

As shown in the figures, the holder portion 40 may also include a flange 44. The flange 44 will preferably be comprised of a machined indentation or projection which acts to stop the nail plate 12 from rotating or moving when secured to the holder portion 40. In a preferred embodiment, the flange 44 extends across the holder portion's 40 outer surface 43 near the first end 22 of the elongated portion 20 of the present invention. The depth of the flange 44 may vary so long as the nail plate 12 is retained thereagainst when secured to the magnet 43.

Figure 8:
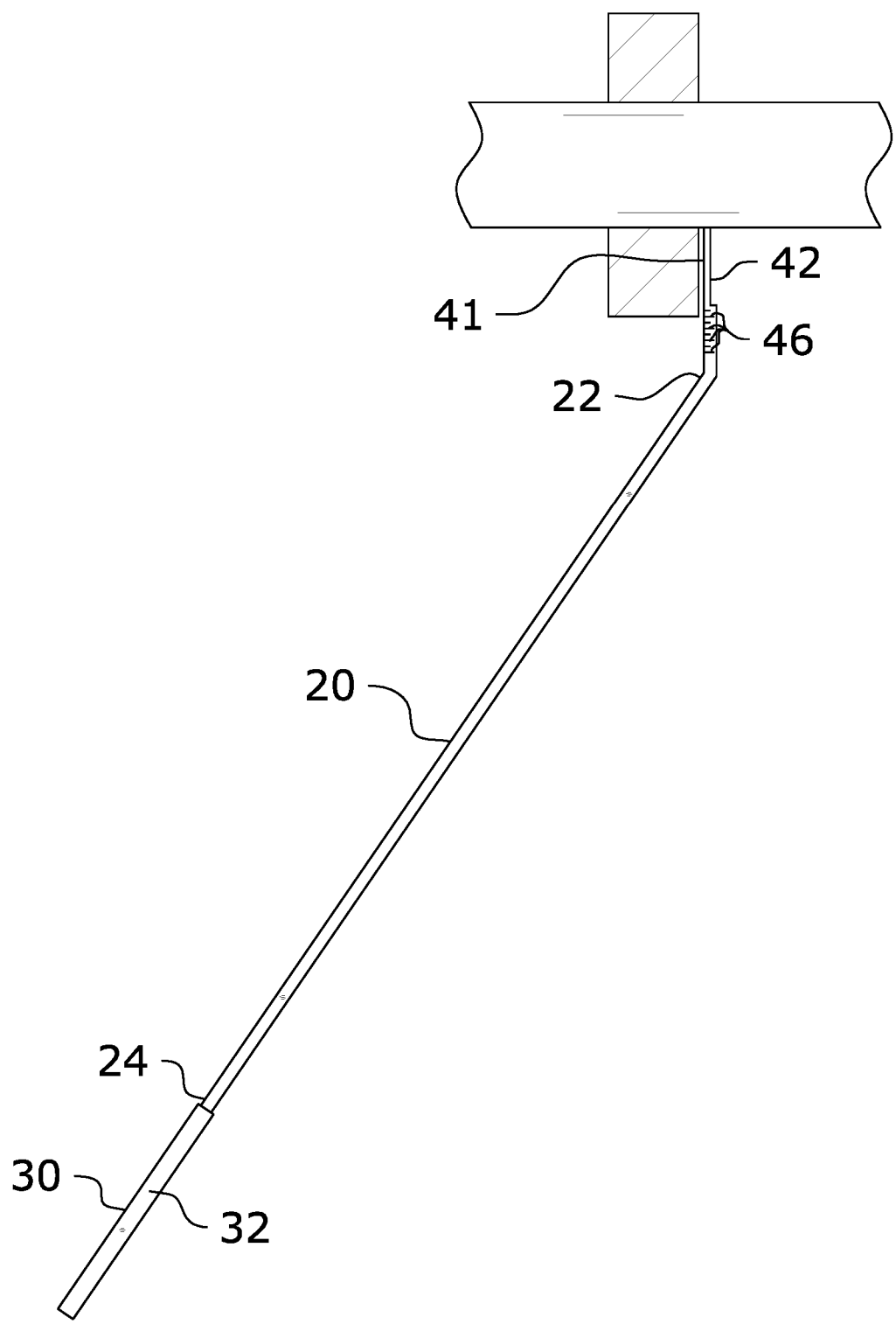
FIG. 8 is a side view of the gauge markings of the present invention in use.
Figure 9:
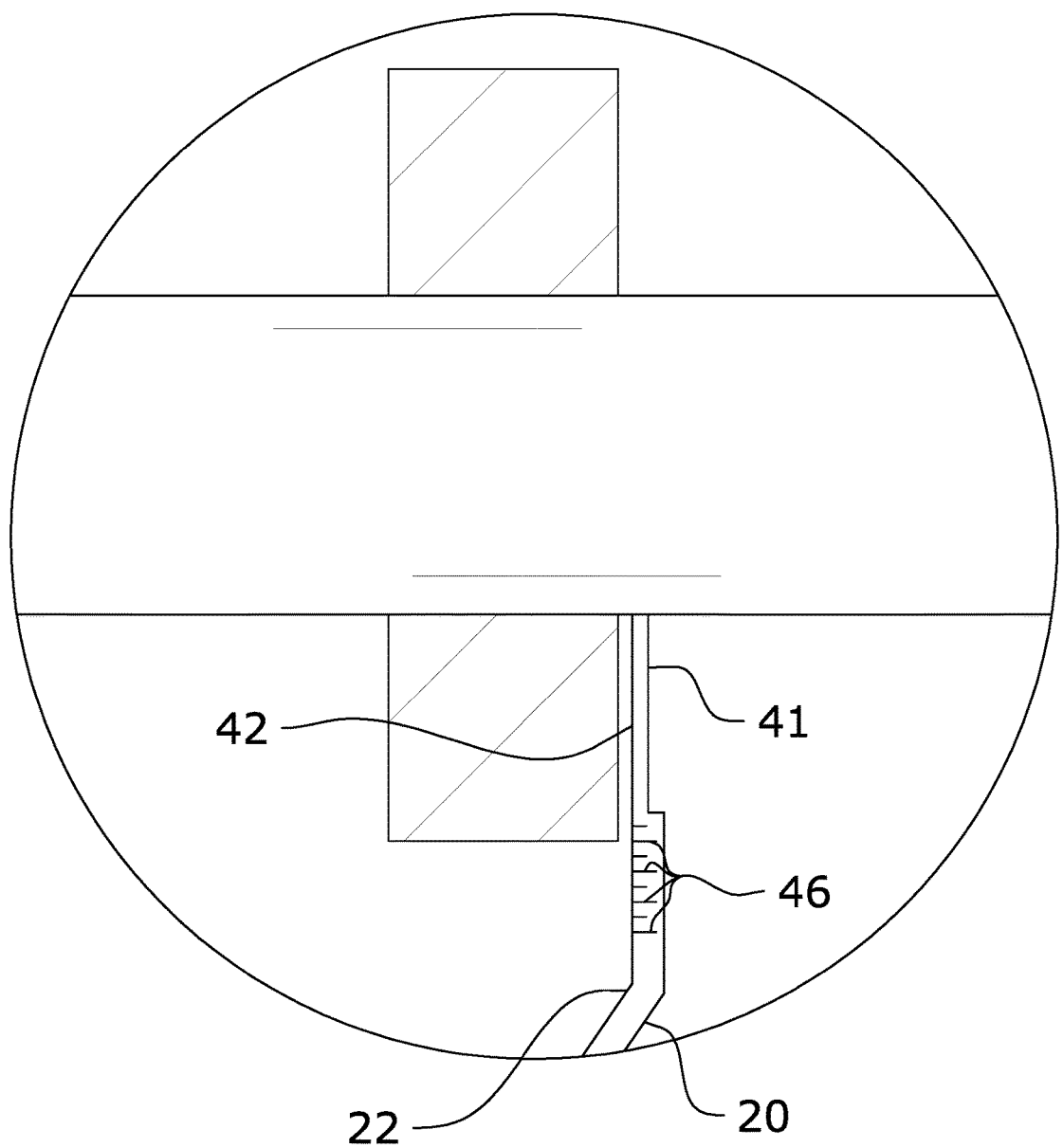
FIG. 9 is a side exploded view of the gauge markings of the present invention in use.
Figure 10:
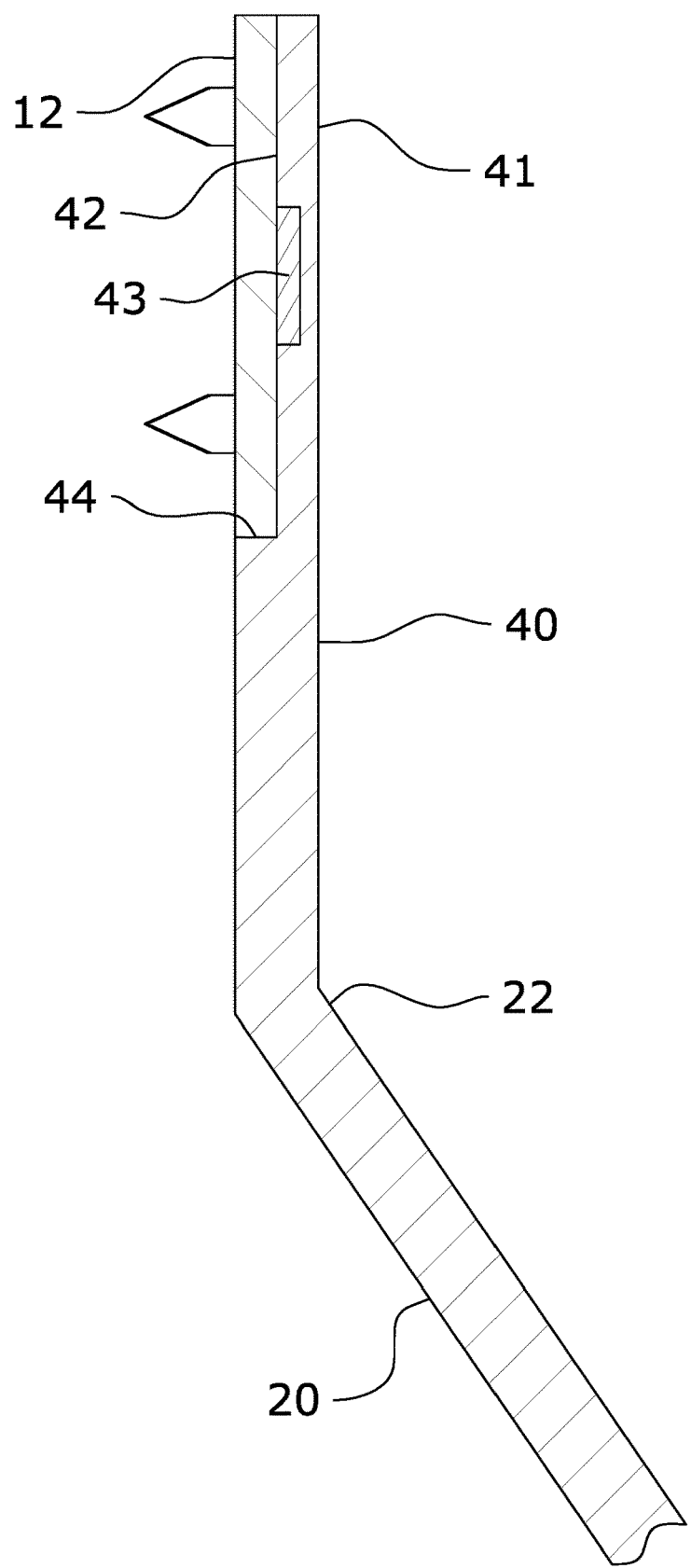
FIG. 10 is a side sectional view of the present invention.

The sides of the holder portion 40 may include gauge markings 46 as shown in the figures. The gauge markings 46 may be etched, drawn, printed, or otherwise marked on the holder portion's 40 outer side edges as shown in the figures. The gauge markings 46 may be utilized to determine whether a nail plate 12 is necessary for a particular installation of piping. If the depth of the joist, stud, or other structure is deeper than the gauge markings 46, a nail plate 12 will be necessary to prevent nails from puncturing the underlying piping or conduit such as shown in FIGS. 8 and 9.

C. Operation of Preferred Embodiment.

Figure 7:
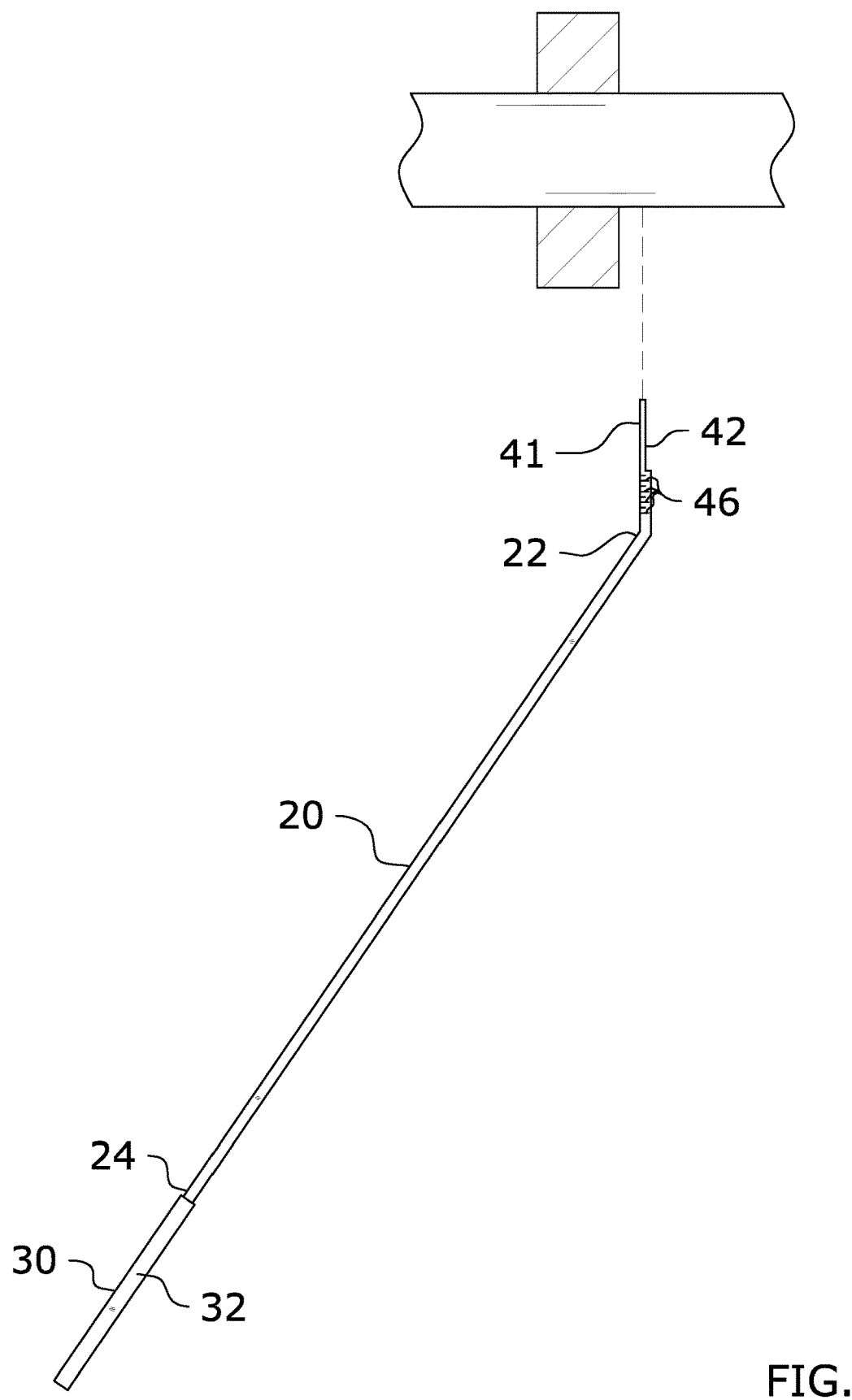
FIG. 7 is a side view of the present invention aligned for use.

In use, the present invention is first utilized to determine whether a nail plate 12 is needed. As shown in FIGS. 7-9, the holder portion 40 of the present invention is aligned beside the joist, stud, or structure to which the piping is installed. The first end 41 of the present invention is pressed up against the piping directly against the joist, stud, or other structure.

The gauge markings 46 will indicate whether the depth of the joist, stud, or other structure is sufficient to negate the need for a nail plate 12. If the depth is insufficient (i.e. does not pass the gauge markings 46), then a nail plate 12 should be installed to prevent accidental puncturing of the piping.

Figure 4:
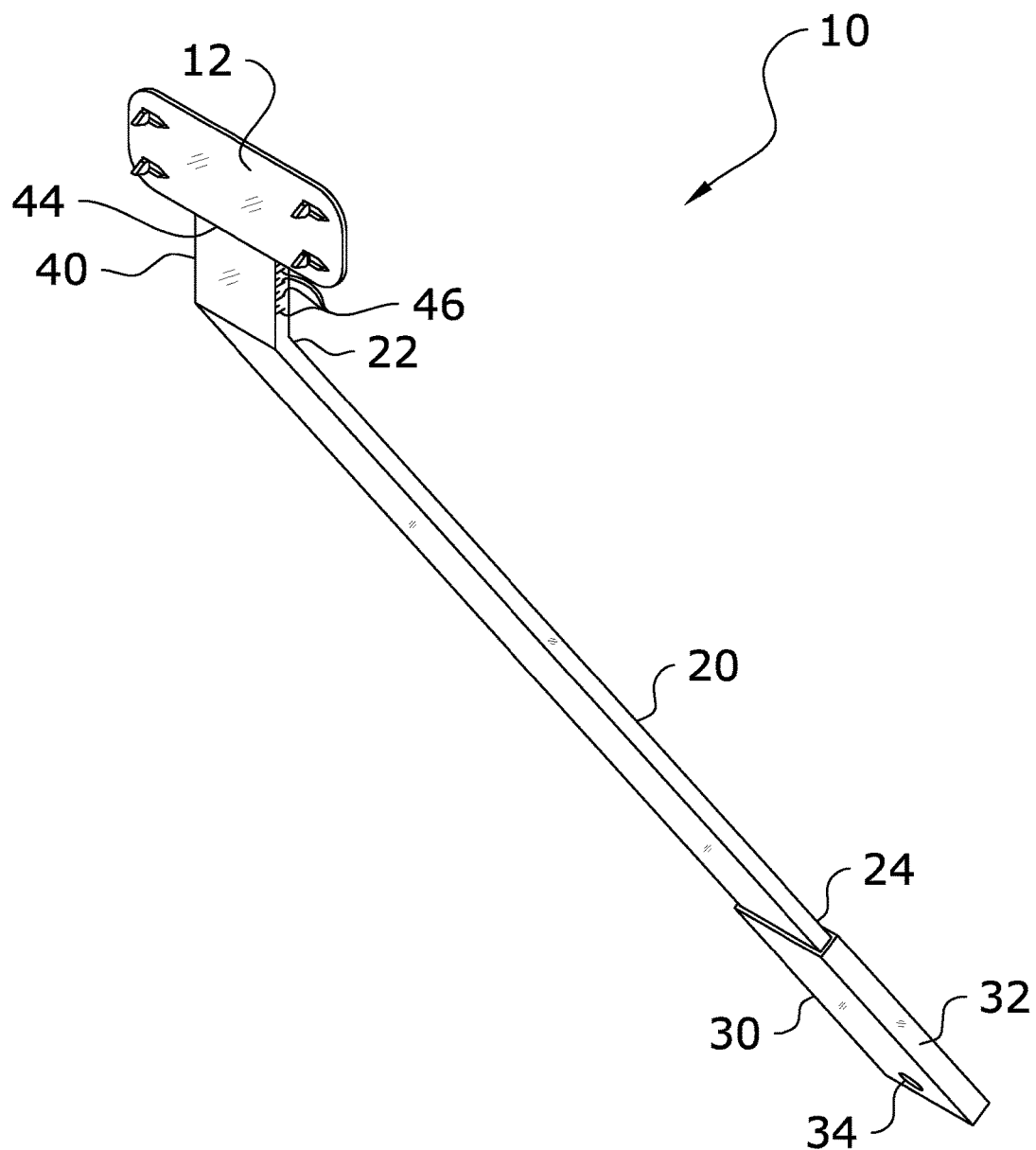
FIG. 4 is a rear upper perspective view of the present invention with the nail plate secured in the holder portion.
Figure 5:
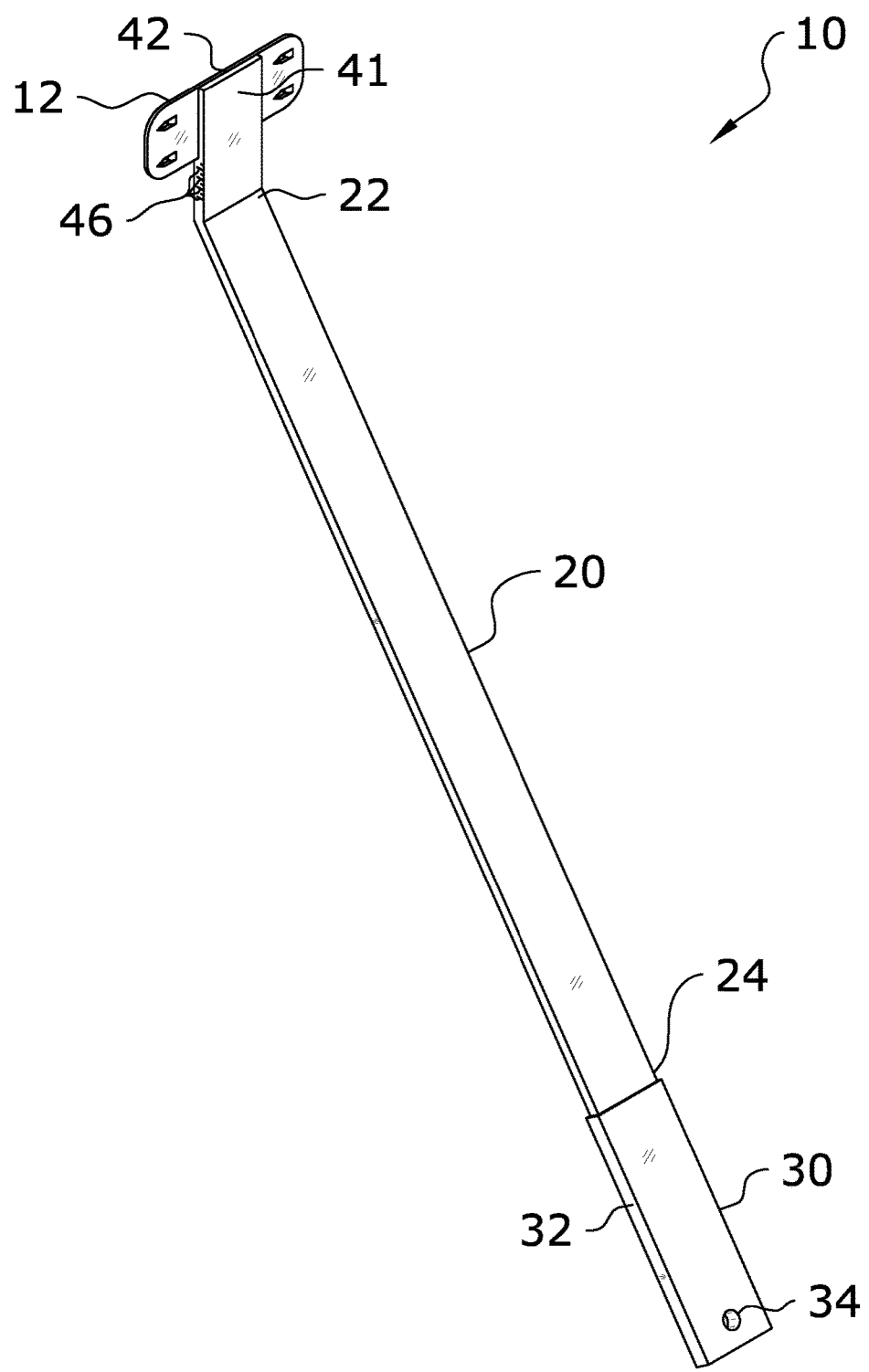
FIG. 5 is a frontal upper perspective view of the present invention with the nail plate secured in the holder portion.
Figure 6:
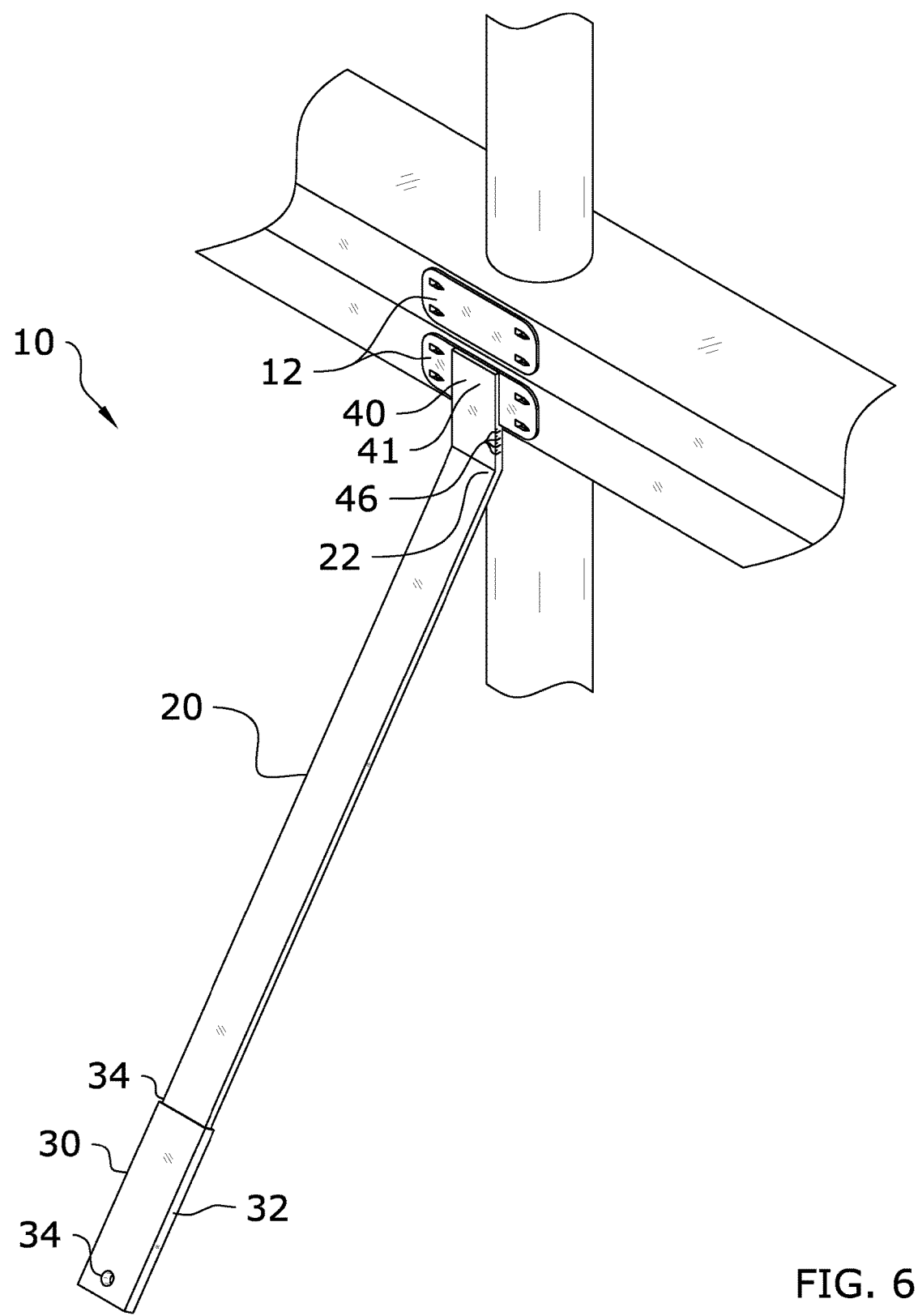
FIG. 6 is an upper perspective view of the present invention being used to install a nail plate.

To install the nail plate 12, the nail plate 12 is first secured to the holder portion 40 of the present invention. The nail plate 12 is aligned with the holder portion 40 as shown in FIG. 3 and then secured against the magnet 42 as shown in FIG. 4. The flange 44 will prevent the nail plate 12 from rotating or becoming dislodged as shown in FIG. 4.

The handle portion 30 of the present invention may then be grasped and used to position the nail plate 12 into place. The nail plate 12 may then be secured to the structure, such as with fasteners and a hammer. A ladder will not be necessary as the present invention will aid with reaching the relevant area.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

What is claimed is:

1. A nail plate tool system, comprising:
a nail plate adapted to be secured to a structure;
an elongated portion having a first end and a second end;
a holder portion adapted to removably retain the nail plate, wherein the holder portion extends from the first end of the elongated portion; and
a projection extending across an outer surface of the holder portion, wherein the projection is adapted to prevent movement of the nail plate when the nail plate is secured against the holder portion, wherein the projection comprises a flange.

2. The nail plate tool of claim 1, wherein the holder portion extends at an angle with respect to the elongated portion.

3. The nail plate tool of claim 1, further comprising a handle portion at the second end of the elongated portion.

4. The nail plate tool of claim 3, wherein the handle portion includes a rubber covering.

5. The nail plate tool of claim 3, wherein the handle portion includes an aperture.

6. The nail plate tool of claim 1, wherein said holder portion includes a magnet for securing the nail plate against the holder portion.

7. The nail plate tool of claim 1, wherein the holder portion comprises a plurality of gauge markings on the holder portion for determining whether the nail plate is needed.

8. The nail plate tool of claim 7, wherein the plurality of gauge markings are positioned on the projection.

9. A nail plate tool system, comprising:
a nail plate adapted to be secured to a structure;
an elongated portion having a first end and a second end;
a holder portion adapted to removably retain the nail plate, wherein the holder portion extends from the first end of the elongated portion, wherein the holder portion comprises a plurality of gauge markings on the holder portion for determining whether the nail plate is needed; and a projection extending across an outer surface of the holder portion, wherein the projection is adapted to prevent movement of the nail plate when the nail plate is secured against the holder portion, wherein the plurality of gauge markings are positioned on the projection.

* * * * *